(12) United States Patent
Gross

(10) Patent No.: US 6,666,664 B2
(45) Date of Patent: Dec. 23, 2003

(54) TECHNIQUE FOR PROTECTING A SUBMERSIBLE MOTOR

(75) Inventor: Edwin Gross, Bartlesville, OK (US)

(73) Assignee: Schlumberger Technology Corporation, Sugarland, TX (US)

(*) Notice: Subject to any disclaimer, the term of this patent is extended or adjusted under 35 U.S.C. 154(b) by 19 days.

(21) Appl. No.: 10/077,263

(22) Filed: Feb. 15, 2002

(65) Prior Publication Data

US 2003/0156947 A1 Aug. 21, 2003

(51) Int. Cl.[7] .......................... F04B 17/00; F04B 19/24; E21B 43/00
(52) U.S. Cl. .............................. 417/423.3; 417/424.2; 417/424.1; 417/423.11; 417/414; 417/53; 166/105
(58) Field of Search .......................... 417/423.3, 424.2, 417/424.1, 423.11, 414, 53; 166/105

(56) References Cited

U.S. PATENT DOCUMENTS

| | | | | |
|---|---|---|---|---|
| 1,954,824 A | * | 4/1934 | Mendenhall et al. | 310/87 |
| 2,002,907 A | * | 5/1935 | Sessions | 417/414 |
| 2,002,914 A | * | 5/1935 | Mendenhall et al. | 310/87 |
| 2,102,018 A | * | 12/1937 | Mendenhall et al. | 318/482 |
| 3,671,786 A | * | 6/1972 | Jones | 310/87 |
| 4,436,488 A | * | 3/1984 | Witten | 417/53 |
| 4,487,299 A | | 12/1984 | Bookout | 188/313 |
| 4,913,239 A | | 4/1990 | Bayh, III | 166/385 |
| 4,940,911 A | | 7/1990 | Wilson | 310/87 |
| 5,296,153 A | | 3/1994 | Peachey | 210/787 |
| 5,762,481 A | * | 6/1998 | Oi | 417/423.3 |
| 6,056,511 A | * | 5/2000 | Kennedy et al. | 417/53 |
| 6,201,327 B1 | | 3/2001 | Rivas | 310/87 |
| 6,242,829 B1 | | 6/2001 | Scarsdale | 310/87 |

* cited by examiner

Primary Examiner—Justine R. Yu
Assistant Examiner—Timothy P. Solak
(74) Attorney, Agent, or Firm—Van Someren, PC; Jeffrey E. Griffin; Brigitte Jefferry Echols

(57) ABSTRACT

A motor protection system that utilizes a motor protector in combination with a submersible motor. The motor protector allows for the free flow of an internal lubricating liquid therethrough to the connected submersible motor. The internal liquid prevents the migration of surrounding, environmental liquids to the interior of the motor while allowing the internal pressure of the motor to equalize with external pressure. Additionally, the design allows the use of a power cable connector that can be coupled to the submersible motor without being sealed with respect to the environmental fluids.

39 Claims, 3 Drawing Sheets

TECHNIQUE FOR PROTECTING A SUBMERSIBLE MOTOR

FIELD OF THE INVENTION

This invention relates generally to the protection of submersible motors that are utilized in systems, such as electric submersible pumping systems, that are submersed in a fluid during operation.

BACKGROUND OF THE INVENTION

A variety of systems are used in the production of fluid from subterranean locations, tanks and other structures that compel the use of submersible systems. For example, a variety of electric submersible pumping systems are used in wellbores to pump petroleum-based fluids.

In a typical system, a pump is powered by a submersible motor. A motor protector is coupled to the submersible motor to allow for pressure equalization between the interior of the motor and the exterior. For example, if the system is utilized deep within a wellbore, the pressure acting on the interior of the motor must be allowed to substantially equalize with the increasing external pressure incurred as the system is moved deeper into the wellbore. Conventional motor protectors utilize labyrinths, isolation chambers, expandable bags and other types of barriers that permit equalization of pressure without allowing external fluid to move into the motor. Thus, the motor is allowed to undergo pressure equalization without contamination of its internal lubricating oil Apart from the motor protector, other potential avenues for entry of external fluids into the motor interior are blocked by seals. For example, a power cable typically is routed through an external housing of the motor to provide power to the motor. The power cable is routed through a connector that is securely sealed to the motor housing. Typically, elastomeric seals are used to facilitate sealing of these and other connections. However, elastomeric seals are susceptible to pressure differentials as well as to certain of the corrosive elements often found in locations wherein submersible pumping systems are utilized.

The present invention addresses these and other drawbacks of current systems.

SUMMARY OF THE INVENTION

The present invention relates generally to a motor protection technique. The technique utilizes a motor protector having a free flow path from an upper region of the motor protector to the interior of the submersible motor. Thus, a lubricating liquid may be placed inside the motor protector and allowed to freely flow into and throughout the interior of the submersible motor. The system obviates the need for complex obstructions or flow inhibiting passageways that prevent movement of external fluids to the interior of the submersible motor. A common fluid deployed within both the motor protector and the submersible motor is designed to prevent mixing or migration of the wellbore fluid through the motor protector to the submersible motor.

According to another aspect of the present invention, a power cable connector is coupled to the submersible motor to permit electrical coupling of a power cable to the motor. The power cable connector comprises a flow passage that permits the flow of liquid between motor protector, submersible motor and power cable connector. In one embodiment, the power cable connector comprises an isolation tube that extends along the motor protector. Although both the motor protector and the isolation tube are exposed to the external environment, the lubricating liquid disposed within prevents migration of environmental fluids to the interior of the submersible motor.

BRIEF DESCRIPTION OF THE DRAWINGS

The invention will hereafter be described with reference to the accompanying drawings, wherein like reference numerals denote like elements, and.

DETAILED DESCRIPTION OF EXEMPLARY EMBODIMENTS

Figure 1:
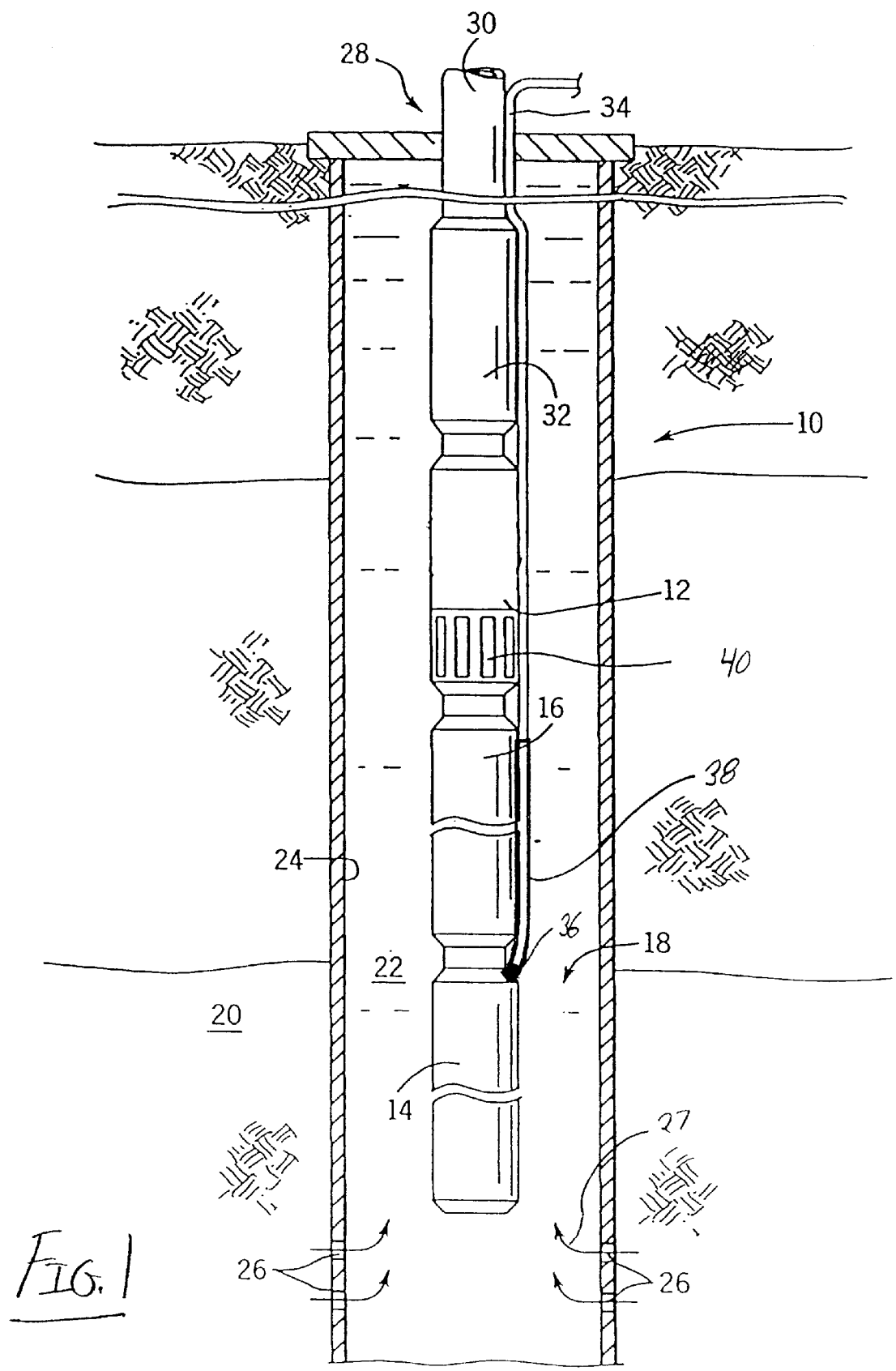
FIG. 1 is a front elevational view of an exemplary pumping system deployed in an exemplary environment, according to one embodiment of the present invention.

Although the present invention is described with reference to a specific embodiment utilized in a specific environment, this description should not be construed as limiting. The motor protection system can be utilized with a variety of pumping systems as well as other systems that may be powered by or benefit from the incorporation of a submersible motor. Similarly, the technique can be used in a variety of environments other than the exemplary subterranean, wellbore environment described. The specific embodiment and environment illustrated and described is used to facilitate an understanding of the invention rather than to limit the invention. On the contrary, the intention is to cover all modifications, equivalents, and alternatives falling within the spirit and scope of the invention as defined by the appended claims Referring generally to FIG. 1, an exemplary electric submersible pumping system 10 is illustrated. The exemplary system comprises at least a submersible pump 12, such as a centrifugal pump, a submersible motor 14 and a motor protector 16.

Pumping system 10 is designed for deployment in a well 18 within a geological formation 20 containing desirable production fluids, such as petroleum. In a typical application, a wellbore 22 is drilled and lined with a wellbore casing 24. Wellbore casing 24 may comprise a plurality of openings 26, commonly referred to as perforations, through which a production fluid 27 flows into wellbore 22 from the environment surrounding submersible motor 14 and motor protector 16. Electric submersible pumping system 10 is deployed in wellbore 22 by a deployment system 28 that may have a variety of configurations. For example, deployment system 28 may comprise tubing 30 connected to pumping system 10 by a connector 32.

Power is provided to submersible motor 14 via a power cable 34 which is coupled to submersible motor 14 by a power cable connector 36. Connector 36 has an isolation tube 38 extending generally along the exterior of motor protector 16 towards an upper region of the protector. Once powered, motor 14 actuates submersible pump 12 which, in turn, draws production fluid 27 into wellbore 22 and through a pump intake 40. The submersible pump 12 then produces the fluid to a desired location, e.g. the surface of the earth, via tubing 30.

Figure 2:
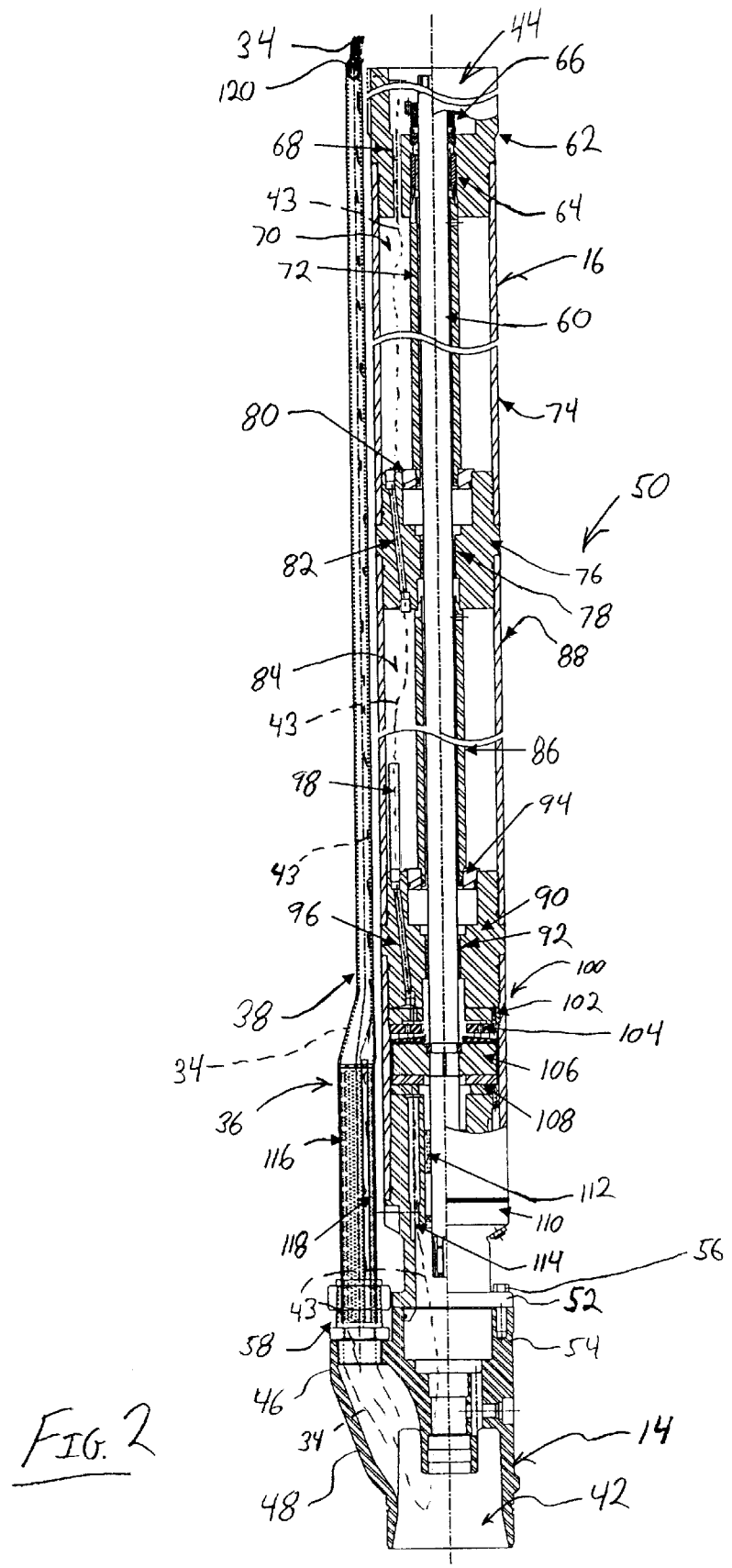
FIG. 2 is a partial cross-sectional view taken generally along the axis of an exemplary motor protector and the top of a submersible motor, similar to those illustrated in FIG. 1.
Figure 3:
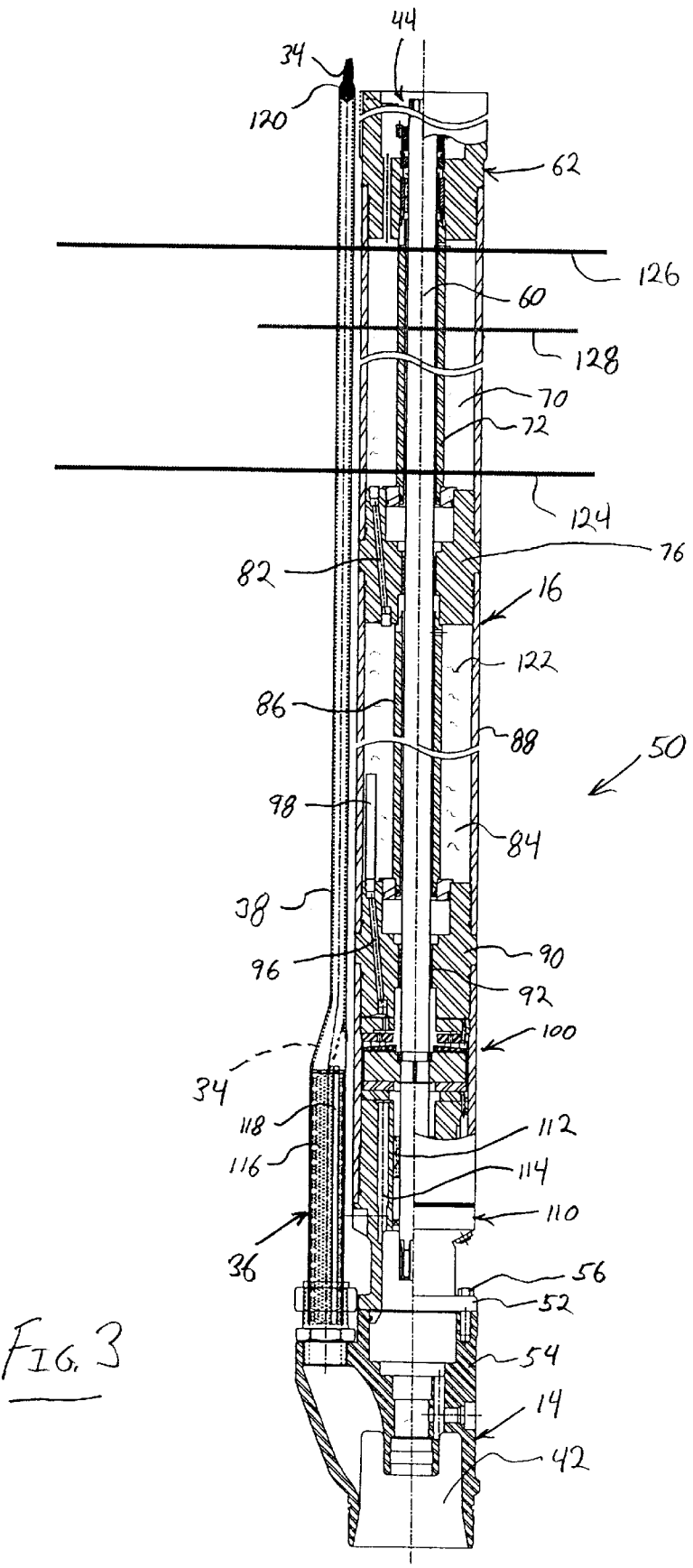
FIG. 3 is a view similar to FIG. 2 illustrating one exemplary approach to filling the system with a desired lubricating liquid.

In the system illustrated, motor protector 16 and submersible motor 14 are filled to a desired level with a lubricating fluid that may freely flow downward through motor protector 16 and into an interior 42 of submersible motor 14, as illustrated in FIGS. 2 and 3. Motor protector 16 is designed to provide a free flow path 43 through the interior of the motor protector to interior 42 of submersible motor 14. Thus, submersible motor 14 and motor protector 16 may be filled simply by pouring the desired liquid into an upper region 44 of motor protector 16.

Free flow path 43 also may be continued through power cable connector 36 and its isolation tube 38. Thus, if a desired liquid is poured into upper region 44 of motor protector 16, the liquid is free to move downwardly through motor protector 16 into interior 42 of submersible motor 14 and ultimately upwardly through power cable connector 36 and its isolation tube 38 until the fluid level in motor protector 16 and isolation tube 38 reaches a substantially equal level. Accordingly, it is not necessary to seal power cable 34 to submersible motor 14 as it enters motor 14 (at a point of entry location 46) through an outer housing 48 of submersible motor 14.

Although a variety of components may be utilized in forming the motor protection system described above, the specifics of one exemplary design is described with reference to FIGS. 2 and 3. In this embodiment, a motor protection system 50 comprises motor protector 16 coupled to submersible motor 14 via a motor protector mounting end 52 attached to a motor coupling end 54 by, for example, appropriate fasteners 56. Also, motor protection system 50 may comprise power cable connector 36 coupled to outer housing 48. In this embodiment, power cable connector 36 is coupled to submersible motor 14 via an unsealed connection and without elastomeric seals. By way of example, the connector may be attached to outer housing 48 via a metal-to-metal connector 58, such as a Swedgelock connector. Other exemplary forms of connection comprise formation of a welded or threaded connection between power cable connector 36 and submersible motor 14.

The exemplary motor protector 16 comprises a shaft segment 60 that is coupled to a corresponding shaft segment (not shown) of submersible motor 14 as known to those of ordinary skill in the art. Shaft 60 is rotatably mounted in an upper protector head 62 via an upper bushing 64. A shaft seal 66 prevents particulates and other solids from moving downwardly along shaft 60. Additionally, a vent port 68 extends between upper region 44 and an isolation chamber region 70. (It should be noted that region 44 is exposed to the environment surrounding motor protector 16 via appropriate parts or openings as with a conventional motor protector.) Isolation chamber 70 is formed as an annular space between an upper shaft tube 72 and an outlying upper isolation chamber housing 74 that forms an outer wall of motor protector 16.

Upper isolation chamber housing 74 is attached to protector head 62 by, for example, threaded engagement and/or an appropriate weldment. At a lower end, isolation chamber housing 74 is similarly coupled to an intermediate support body 76 by, for example, appropriate threaded and/or welded engagement.

Intermediate support body 76 rotatably receives shaft segment 60 and supports the shaft via an internal bushing 78. Additionally, a shaft tube support ring 80 is positioned to couple upper shaft tube 72 to intermediate support body 76. A communication port 82 extends generally longitudinally through intermediate support body 76 to permit fluid flow through support body 76 between upper isolation chamber 70 and a lower isolation chamber 84.

Lower isolation chamber 84 generally comprises an annular chamber defined between a lower shaft tube 86 and an outlying lower isolation chamber housing 88. As described above with respect to upper isolation chamber housing 74, lower isolation chamber housing 88 is connected to intermediate support body 76 and extends downwardly to a lower support body 90. Housing 88 is connected to support body 90 by, for example, an appropriate threaded and/or welded connection.

Lower support body 90 rotatably receives shaft segment 60 and supports rotation of the shaft via a bushing 92. Additionally, a lower shaft tube support ring 94 couples lower shaft tube 86 to an upper portion of support body 90, as illustrated. Lower support body 90 also comprises a generally longitudinal communication port 96 that allows the free flow of liquid therethrough. A breather-stand tube 98 may be coupled to lower support body 90 in fluid communication with communication port 96 and extending upwardly therefrom. Breather tube 98 inhibits the ability of particulate matter to migrate through lower support body 90 to lower components. Thus, if sand or other particulate matter manages to move into lower isolation chamber 84, the particulates tend to collect along the upper surface of lower support body 90 instead of passing through communication port 96.

In the embodiment illustrated, a thrust bearing system 100 is disposed below lower support body 90. According to one exemplary embodiment, thrust bearing system 100 comprises a thrust bearing locking ring 102 positioned between lower support body 90 and an upthrust bearing 104. A thrust bearing runner 106 is disposed below upthrust bearing 104, and a downthrust bearing 108 is disposed between thrust bearing runner 106 and a lower protector base 110. Thrust bearing system 100 can be any of a variety of thrust bearing types that are commonly used in submersible pumping components.

Lower protector base 110 rotatably receives shaft segment 60 and supports the shaft segment via a bushing 112. Additionally, a communication port 114 extends through lower protector base 110 from thrust bearing system 100 to motor protector mounting end 52. Communication port 114 permits the flow of internal liquid into interior 42 of submersible motor 14. It should be noted that the flow of liquid is not restricted through thrust bearing system 100, so liquid is permitted to freely flow from communication port 96 through thrust bearing system 100 and then downwardly into submersible motor 14 via communication port 114. Thus, a free flow passage is formed from upper region 44 of motor protector 16 through vent port 68, isolation chamber 70, communication port 82, lower isolation chamber 84, communication port 96, thrust bearing system 100 and communication port 114 to interior 42 of submersible motor 14.

Depending on the specific design of motor protection system 50, the free flow of internal liquid may be allowed to continue through power cable connector 36 and its isolation tube 38. In the illustrated embodiment, power cable 34 is secured within power cable connector 36 via an epoxy 116 or other comparable material to anchor the power cable and to provide strain relief with respect to its connection to submersible motor 14. However, a breather tube 118 extends longitudinally through epoxy 116 to permit the flow of liquid therethrough. Isolation tube 38 includes an upper open end or port 120 that permits direct communication between the interior of isolation tube 38 and the environmental fluid that surrounds submersible motor 14 and motor protector 16.

To prevent potentially deleterious environmental fluids from reaching interior 42 of submersible motor 14, motor protection system 50 is filled to an operational level with a desired internal liquid 122. Internal liquid 122 is selected for its ability to prevent migration of environmental fluid, such as wellbore fluids, through motor protector 16 and/or power cable connector 36 to the interior of submersible motor 14. Otherwise, the wellbore fluids could cause excessive wear and other to damage internal components of the motor.

Internal liquid 122 may be selected for its lack of affinity with the surrounding environmental fluids. In the example illustrated, motor protector system 50 is utilized in a wellbore environment for the production of oil-based fluids. Accordingly, internal liquid 122 may be selected for its inability or limited ability to mix with oil-based fluids. Additionally, internal liquid 122 typically is selected with a greater specific gravity than the surrounding fluids. For example, wellbore fluids may have a specific gravity of approximately 0.8 or less. Accordingly, internal liquid 122 is selected such that its specific gravity is greater than approximately 1.0, and for many applications the specific gravity is greater than approximately 1.5. Thus, the internal liquid 122 is substantially heavier than the surrounding environmental fluids, and the surrounding environmental fluids are unable to move downwardly through isolation tube 38 or motor protector 16 to submersible motor 14.

By way of specific example, internal liquid 122 may be a relative heavy polytetrafluoroethylene (PTFE)-based liquid. Such liquids do not mix with the typical fluid components found in a wellbore environment. A specific example of such a liquid is a PTFE-based liquid referred to as Uniflor available from Nye Lubricants Company. The liquid is a lubricating liquid rated ISO 500 with a specific gravity of approximately 1.9. This type of liquid is substantially heavier (i.e., a greater specific gravity) than the surrounding oil-based fluids. Also, because the lubricant is not oil-based, the wellbore fluids do not mix with the internal liquid 122.

In an exemplary application, internal liquid 122 is poured into upper region 44 of motor protector 16 and the liquid flows downwardly through motor protector 16. The liquid fills interior 42 of submersible motor 14 and rises through power cable connector 36 until the system is filled to a desired level, labeled with reference numeral 124 in FIG. 3. The remainder of motor protector 16 and isolation tube 38 may be filled with a less expensive, sacrificial liquid that is typically lost during deployment and initial startup of the system. However, internal liquid 122 also could be used to fill motor protector 16 and isolation tube 38 to a higher level. Once motor protector 16 is filled to desired level 124, the remaining components of electric submersible pumping system 10 are connected and the submersible pumping system 10 is deployed to a desired location within wellbore 22. Both the natural heat of the subterranean location and the heating of motor during initial operation causes internal liquid 122 to heat and expand to a higher level, labeled 126 in FIG. 3. Excess liquid, e.g. a sacrificial liquid, is expelled through upper open end 120 of isolation tube 38 and/or upper region 44 of motor protector 16 into the surrounding environment.

When submersible motor 14 is shut down, the heavier internal liquid 122 cools and the fluid level moves downwardly to an intermediate level, labeled as level 128 in FIG. 3. Thus, even though internal liquid 122 is free to flow through the entire extent of motor protector 16 and submersible motor 14, deleterious environmental fluids are not able to migrate into submersible motor 14. If power cable connector 36 is utilized, a free flow path 43 is created throughout motor protector 16, submersible motor 14, and power cable connector 36, including isolation tube 38, without incurring migration of unwanted fluids into submersible motor 14. The use of this system allows not only the elimination of complex flow inhibiting devices within motor protector 16, but also the elimination of elastomeric seals otherwise used to form fluid-tight seals at various junctions, such as at the juncture of power cable 34 with submersible motor 14.

It will be understood that the foregoing description is of exemplary embodiments of this invention, and that the invention is not limited to the specific forms shown. For example, the motor protection system may be utilized with a variety of motor types, in a variety of applications and submerged within various environmental fluids. Additionally, the size and shape of the motor protector, submersible motor and power cable connector can be changed according to the specific application or desired design parameters. The number and configuration of support bodies, longitudinal ports, bushings and other components internal to the motor protector also can be changed. These and other modifications may be made in the design and arrangement of the elements without departing from the scope of the invention as expressed in the appended claims.

What is claimed is:

1. A system for producing a fluid, comprising:
    a submersible pump;
    a submersible motor; and
    a motor protector coupled to the submersible motor between the submersible motor and the submersible pump, the motor protector comprising an open flow path that permits an internal fluid to flow from an upper region of the motor protector to an interior of the submersible motor and an isolation tube including an upper open end that permits direct communication between an interior of the isolation tube and the fluid surrounding the submersible motor and motor protector.

2. The system as recited in claim 1, further comprising the internal fluid, wherein the internal fluid has a specific gravity greater than the fluid to be produced.

3. The system as recited in claim further comprising a power cable connector coupled to the submersible motor, the power cable connector being unsealed with respect to flow of the internal fluid.

4. The system as recited in claim 3, comprising a power cable received within the power cable connector.

5. The system as recited in claim 4, wherein the power cable connector comprises an isolation tube that extends generally along an exterior of the motor protector, further wherein the internal fluid is free to flow between the isolation tube, the submersible motor and the motor protector.

6. The system as recited in claim 2, wherein the internal fluid has a specific gravity greater than 1.5.

7. The system as recited in claim 2, wherein the internal fluid has a specific gravity of approximately 1.9.

8. The system as recited in claim 2, wherein the internal fluid is free of petroleum-based fluids.

9. A system for producing a fluid, comprising:
    an electric submersible pumping system having a submersible motor, a pump, a motor protector disposed between the submersible motor and the pump, a power cable, and an unsealed power cable connector through which the power cable extends to provide power to the submersible motor; and a common lubricating fluid disposed in the submersible motor and the motor protector, wherein the common lubricating fluid is allowed to flow between the submersible motor and the motor protector; and an isolation tube including an upper open end that permits direct communication between an interior of the isolation tube and the fluid surrounding the submersible motor and motor protector.

10. The system as recited in claim 9, wherein the common lubricating fluid has a specific gravity greater than 1.

11. The system as recited in claim 9, wherein the common lubricating fluid has a specific gravity greater than 1.5.

12. The system as recited in claim 9, wherein the common lubricating fluid has a specific gravity of approximately 1.9.

13. The system as recited in claim 9, wherein the common lubricating fluid is free of petroleum-based fluids.

14. The system as recited in claim 9, wherein the common lubricating fluid comprises a PTFE chemical.

15. The system as recited in claim 9, wherein the power cable is anchored within the isolation tube by an epoxy having a fluid passage.

16. The system as recited in claim 9, wherein the isolation tube is attached to the submersible motor by a metal-to-metal connection.

17. A submersible motor system, comprising:
a submersible motor;
a motor protector coupled to the submersible motor, the motor protector having an unobstructed passageway between an opening to the surrounding environment and an interior of the submersible motor;
a liquid formulated to block the flow of an environmental fluid to the submersible motor; and
an isolation tube coupled to the submersible motor, the isolation tube having a passageway to permit the liquid to flow form the interior of the submersible motor into the isolation tube and an upper end that permits direct communication between the interior of the isolation tube and the fluid surrounding the submersible motor and motor protector.

18. The submersible motor system as recited in claim 17, wherein the liquid maintains its integrity with respect to the environmental fluid.

19. The submersible motor system as recited in claims 17, wherein the liquid is a lubricating liquid.

20. The submersible motor system as recited in claims 17, wherein the liquid has a specific gravity greater than the environmental fluid.

21. The submersible motor system as recited in claim 20, wherein the liquid has a specific gravity greater than 1.5.

22. The submersible motor system as recited in claim 17, further comprising a motor power cable disposed within the isolation tube.

23. A system of protecting a submersible motor without requiring sealed regions, comprising:
an isolation tube including an upper open end that permits direct communication between an interior of the isolation tube and the fluid surrounding the submersible motor; means for coupling a motor protector and the isolation tube to the submersible motor;
means for opening the motor protector and the isolation tube to a well-bore environment at a position above the submersible motor when deposed in an operating orientation; and
means for providing a free flowing passageway through the motor protector, the submersible motor and the isolation tube.

24. The system as recited in claim 23, wherein the means for opening comprises at least two ports to the environment.

25. The system as recited in claim 23, wherein the means for providing comprises a series of passages through the motor protector.

26. The system as recited in claim 23, wherein the means for coupling comprises a metal-to-metal connection between the isolation tube and the submersible motor.

27. A method of protecting a submersible motor, comprising:
coupling a motor protector to a submersible motor;
eliminating barriers to the flow of liquid from an upper region of the motor protector to a bottom region of the submersible motor;
filling the submersible motor and the motor protector to a desired level with a lubricating fluid having a specific gravity greater than the specific gravity of fluid into which the submersible motor is submerged during operation;
connecting a power cable connector to the submersible motor with a metal-to-metal connection; and
providing a flow passage from the submersible motor through the power cable connector to permit flow of the lubricating fluid therethrough.

28. The method as recited in claim 27, wherein eliminating barriers comprises providing flow passages along the motor protector to permit the lubricating fluid to freely flow through the motor protector and the submersible motor.

29. The method as recited in claim 27, further comprising forming the power cable connector with an elongated isolation tube sized to receive a power cable therein and to lie along the exterior of the motor protector.

30. The method as recited in claim 27, wherein filling comprises filling the submersible motor and the motor protector with the lubricating fluid having a specific gravity greater than 1.

31. The method as recited in claim 27, wherein filling comprises filling the submersible motor and the motor protector with the lubricating fluid having a specific gravity greater than 1.5.

32. The method as recited in claim 27, wherein filling comprises filling the submersible motor and the motor protector with the lubricating fluid having a specific gravity of approximately 1.9.

33. A method of protecting a submersible motor without requiring sealed regions, comprising:
an isolation tube including an upper open end that permits direct communication between an interior of the isolation tube and the fluid surrounding the submersible motor; coupling a motor protector and the isolation tube to the submersible motor;
opening the motor protector and the isolation tube to a well-bore environment at a position above the submersible motor when disposed in an operating orientation; and
providing a free flowing passageway through the motor protector, the submersible motor and the isolation tube.

34. The method as recited in claim 33, further comprising adding a lubricating fluid to the motor protector, the submersible motor and the isolation tube.

35. The method as recited in claim 34, further comprising routing a power cable to the submersible motor through the isolation tube.

36. The method as recited in claim 34, wherein adding comprises adding a lubricating fluid having a specific gravity higher than that of the fluid in which the submersible motor is submerged.

37. The method as recited in claim 36, wherein the specific gravity is at least 1.5.

38. The method as recited in claim 36, wherein the specific gravity is approximately 1.9.

39. The method as recited in claim 34, wherein adding comprises adding a PTFE-based lubricating fluid.

* * * * *

UNITED STATES PATENT AND TRADEMARK OFFICE
CERTIFICATE OF CORRECTION

PATENT NO.    : 6,666,664 B2
DATED         : December 23, 2003
INVENTOR(S)   : Edwin Gross It is certified that error appears in the above-identified patent and that said Letters Patent is hereby corrected as shown below:

<u>Title page,</u>
Item [73], Assignee, delete "Sugarland" and insert -- Sugar Land --; and
Item [74], *Attorney, Agent, or Firm,* delete "Jefferry" and insert -- Jeffery --.

Signed and Sealed this

Twenty-fourth Day of February, 2004

JON W. DUDAS
*Acting Director of the United States Patent and Trademark Office*